(No Model.)
S. H. MARKHAM.
MICROMETER CALIPERS.
No. 561,802. Patented June 9, 1896.
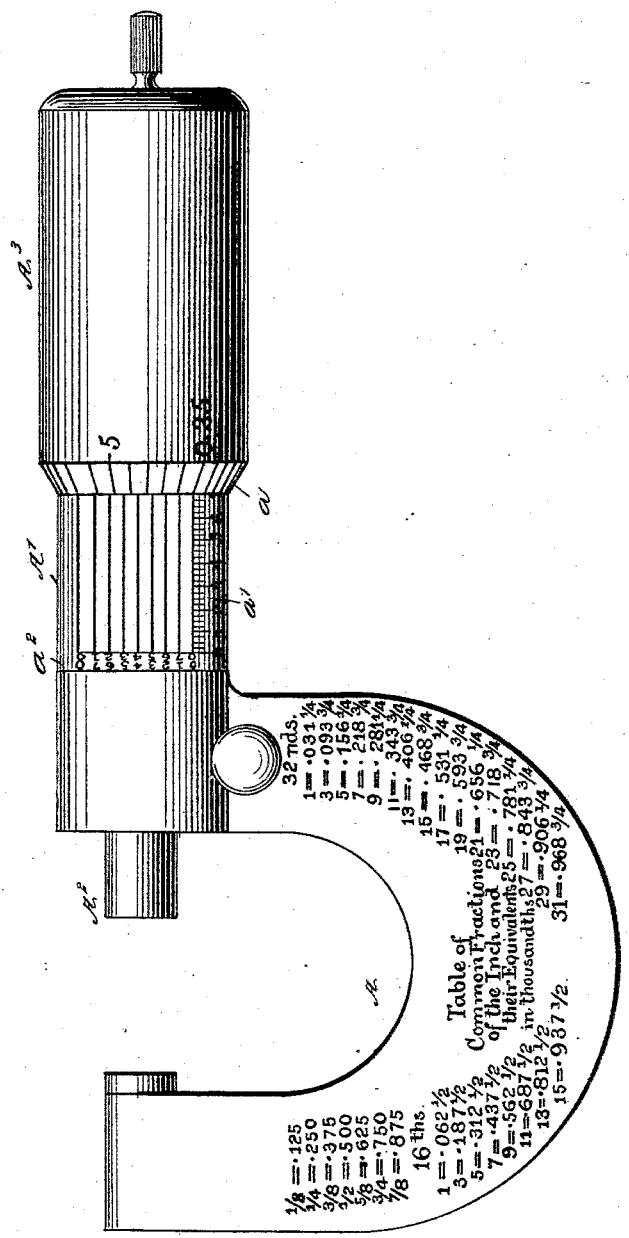
WITNESSES:
INVENTOR
S. H. Markham
BY
Munn & Co
ATTORNEYS.

UNITED STATES PATENT OFFICE.

SAMUEL H. MARKHAM, OF PITTSBURG, PENNSYLVANIA.

MICROMETER-CALIPERS.

SPECIFICATION forming part of Letters Patent No. 561,802, dated June 9, 1896.

Application filed May 8, 1895. Serial No. 548,469. (No model.)

*To all whom it may concern:*

Be it known that I, SAMUEL H. MARKHAM, of Pittsburg, in the county of Allegheny and State of Pennsylvania, have invented a new and useful Improvement in Micrometer-Calipers, of which the following is a full, clear, and exact description.

This invention relates to certain improvements in that class of instruments commonly known as "micrometer-gages" and employed for determining with exactitude small measurements; and the object of the invention is to provide a device of this character of a simple and inexpensive construction which shall be adapted for determining measurements with greater accuracy than other similar devices heretofore employed.

Heretofore in devices of this character it has been customary to provide calipers or gages with verniers reading to tens of thousandths of inches; but it has been found in practice that such graduations are not capable of sufficiently close reduction into the common fractions of an inch, such as halves, quarters, tenths, hundredths, thousandths, thirty-seconds, sixty-fourths, &c., for use in fine machine-work.

In carrying out the invention I provide micrometer gages or calipers with verniers reading to eighths of thousandths of inches, to which fractions alone it is possible to reduce with accuracy ordinary common fractions of the inch above noted.

In the accompanying drawing, which serves to illustrate my invention, I have shown the same embodied in a micrometer-caliper of ordinary construction.

In said drawing, A represents the frame or bow of the caliper, and A' represents the shank or stem thereof, wherein is mounted and movable longitudinally the jaw $A^2$, actuated from the rotative sleeve $A^3$, carried on and movable longitudinally over the exterior of said shank.

In the frame or bow A of the instrument is stamped or impressed a table of the common fractions of the inch and their equivalents in thousandths. As herein shown, the table comprises eighths, sixteenths, and thirty-seconds of an inch, and in practice the table of sixty-fourths may be impressed upon the opposite side of the instrument in a similar manner.

On the shank A' of the instrument is formed a vernier comprising a series of graduations $a'$, extending longitudinally of the shank and representing fortieths of an inch, said graduations being subdivided into groups of four or tenths in the usual way. The vernier also comprises a series of eight graduations $a^2$, extending parallel to the base-line of the graduations $a'$, said series of graduations being evenly spaced apart and extending longitudinally of the shank A'.

The lower end of the rotating sleeve $A^3$ is beveled or tapered slightly, as clearly seen in the drawing, and is provided with a series of twenty-five graduations $a$, extending around said beveled face, said graduations being divided into groups of five, numbered, successively, from "5" to "25," the "0" and "25" being coincident, and each of said graduations corresponds to the thousandth part of an inch.

The internal mechanism of the device is such that during each complete rotation of the sleeve $A^3$ the jaw $A^2$ will be moved .025 of an inch, and said sleeve $A^3$ will also travel along the graduations $a'$ on the shank A' one-fortieth of an inch.

The graduations $a^2$ of the vernier occupy a space upon the shank A' corresponding in width to seven of the divisions or graduations $a$ upon the sleeve $A^3$, whereby it will be seen that if the sleeve $A^3$ is turned so that any particular one of its graduations $a$ coincides with either of the lines forming the graduations $a^2$ of the vernier the adjustment of the jaw $A^2$ will be correspondingly changed.

As shown in the drawing, the graduation $a$ on the sleeve $A^3$ corresponding to .002 of an inch is in alinement with the graduation $a^2$ of the vernier corresponding to two-eighths of a thousandth of an inch and the graduation $a$ on the sleeve $A^3$ which corresponds to .001 of an inch has therefore been moved two-eighths of a thousandth of an inch beyond the base-line of the scale $a'$ of the vernier. Consequently the instrument reads ".701⅜."

In order that the graduations $a^2$ of the vernier may be more readily used, I provide at the end of the series a double scale of index characters running in opposite directions and numbered from "1" to "8," so that the said graduations may be used conveniently from either end of the series.

The device constructed as above described is extremely simple and inexpensive and may be employed to determine with the greatest accuracy all of the common divisions of the inch which it is impossible to accurately measure with instruments graduated, as heretofore, to tens of thousandths of inches.

Having thus described my invention, I claim as new and desire to secure by Letters Patent—

A micrometer-gage, comprising a frame having a tubular shank, a jaw movable in said shank, a sleeve movable rotatively and longitudinally on the shank and operatively connected to said movable jaw, graduations formed around one end of the sleeve, and a series of eight graduations each extending longitudinally of the shank and adapted to be traversed by the graduations on the end of the sleeve, said series of eight graduations occupying a part of the surface of the shank corresponding to the space occupied by seven graduations on the sleeve, substantially as set forth.

SAMUEL H. MARKHAM.

Witnesses:
JAMES BROWN,
A. C. FRANK.